(12) United States Patent
Yazaki et al.

(10) Patent No.: US 11,588,358 B2
(45) Date of Patent: Feb. 21, 2023

(54) COMMUNICATION CONTROL DEVICE

(71) Applicant: IHI Corporation, Tokyo (JP)

(72) Inventors: Satoshi Yazaki, Tokyo (JP); Michisato Maekawa, Tokyo (JP); Naoki Omura, Tokyo (JP); Yusuke Oono, Tokyo (JP); Atsushi Asano, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/267,058

(22) PCT Filed: Jun. 14, 2019

(86) PCT No.: PCT/JP2019/023629
§ 371 (c)(1),
(2) Date: Feb. 9, 2021

(87) PCT Pub. No.: WO2020/049825
PCT Pub. Date: Mar. 12, 2020

(65) Prior Publication Data
US 2021/0296945 A1    Sep. 23, 2021

(30) Foreign Application Priority Data
Sep. 4, 2018    (JP) .............................. JP2018-165183

(51) Int. Cl.
*H02J 50/90* (2016.01)
*H02J 50/80* (2016.01)
(Continued)

(52) U.S. Cl.
CPC .............. *H02J 50/90* (2016.02); *B60L 53/12* (2019.02); *H01Q 1/32* (2013.01); *H02J 50/12* (2016.02);
(Continued)

(58) Field of Classification Search
CPC .. H02J 50/90; H02J 50/23; H02J 50/40; H02J 50/80; H02J 50/12; B60L 53/12; H01Q 1/32
See application file for complete search history.

(56) References Cited

U.S. PATENT DOCUMENTS

2012/0309308 A1    12/2012    Kim et al.
2013/0035034 A1    2/2013    Kim et al.
(Continued)

FOREIGN PATENT DOCUMENTS

JP    2007-158485 A    6/2007
JP    2012-075249 A    4/2012
(Continued)

OTHER PUBLICATIONS

Inoue, Kiichi, "Wireless LAN Portal" Eliminates 5GHz Band Congestion Using "DFS", ITmedia PC User, [online] https://www.itmedia.eo.jp/pcuser/articles/1607/01/news112.html, Jul. 1, 2016.

*Primary Examiner* — Daniel Kessie
*Assistant Examiner* — Brian K Baxter
(74) *Attorney, Agent, or Firm* — Volpe Koenig

(57) ABSTRACT

A communication control device comprises: an antenna; and a control unit that controls wireless communication related to wireless power transfer to a power receiver device through a power transmitter device. The control unit acquires via the antenna a radio wave status of each of a plurality of channels related to the wireless communication. The control unit acquires a power transmission status of the wireless power transfer. The control unit sets, based on the acquired power transmission status, switching conditions for switching the channel according to the radio wave status. The control unit causes the channel to be switched based on (Continued)

the radio wave status and the switching conditions. The control unit causes the wireless communication to continue on the switched channel.

8 Claims, 5 Drawing Sheets

(51) Int. Cl.
    *H02J 50/12*     (2016.01)
    *H02J 50/23*     (2016.01)
    *H02J 50/40*     (2016.01)
    *B60L 53/12*     (2019.01)
    *H01Q 1/32*     (2006.01)

(52) U.S. Cl.
    CPC .............. *H02J 50/23* (2016.02); *H02J 50/40* (2016.02); *H02J 50/80* (2016.02)

(56) References Cited

U.S. PATENT DOCUMENTS

| | | | | |
|---|---|---|---|---|
| 2013/0058380 | A1* | 3/2013 | Kim | H04W 72/02 375/146 |
| 2014/0159647 | A1 | 6/2014 | Nishioka | |
| 2018/0236879 | A1* | 8/2018 | Elshaer | G01R 31/006 |
| 2018/0269925 | A1* | 9/2018 | Matsuo | H02J 7/025 |

FOREIGN PATENT DOCUMENTS

| | | |
|---|---|---|
| JP | 2013-209845 A | 10/2013 |
| JP | 2013-212003 A | 10/2013 |
| JP | 2014-168288 A | 9/2014 |
| JP | 2016-131351 A | 7/2016 |
| JP | 2017-022876 A | 1/2017 |
| JP | 2017-028960 A | 2/2017 |
| JP | 2017-143664 A | 8/2017 |

* cited by examiner

*Fig.3*

| STAGE | POWER TRANSMISSION STATUS | EASE OF SWITCHING OF SWITCHING CONDITIONS |
|---|---|---|
| FIRST STAGE | BEFORE START OF POWER TRANSMISSION<br>BEFORE START OF WIRELESS COMMUNICATION | 4 |
| SECOND STAGE | BEFORE START OF POWER TRANSMISSION<br>DURING WIRELESS COMMUNICATION<br>BEFORE START OF POSITIONAL ADJUSTMENT | 3 |
| THIRD STAGE | BEFORE START OF POWER TRANSMISSION<br>DURING WIRELESS COMMUNICATION<br>DURING POSITIONAL ADJUSTMENT | 2 |
| FOURTH STAGE | DURING POWER TRANSMISSION<br>DURING WIRELESS COMMUNICATION | 1 |
| FIFTH STAGE | AFTER END OF POWER TRANSMISSION<br>AFTER END OF WIRELESS COMMUNICATION | 4 |

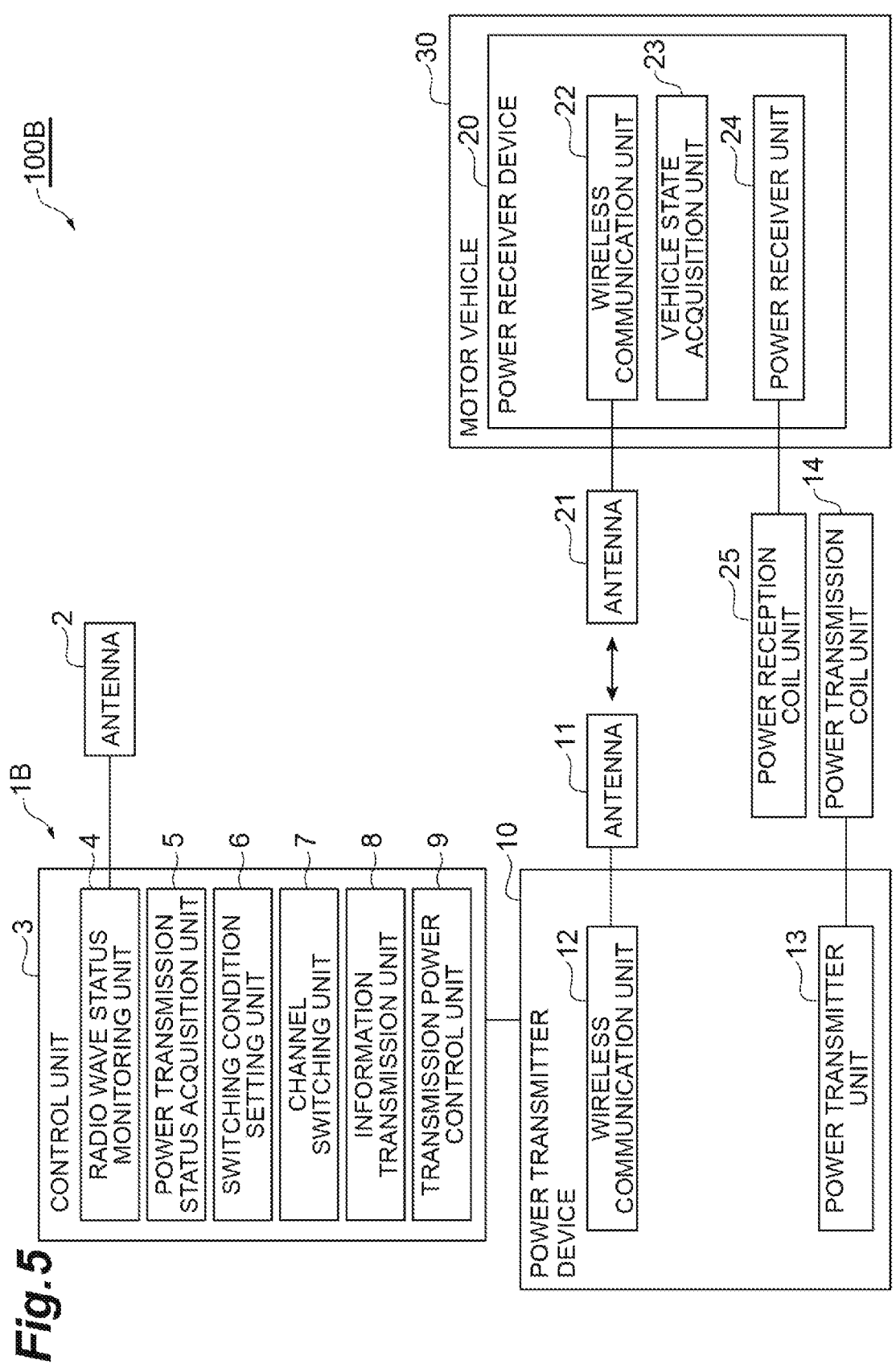

COMMUNICATION CONTROL DEVICE

TECHNICAL FIELD

This disclosure relates to a communication control device.

BACKGROUND ART

Technology related to wireless power transfer to power receiver devices mounted on motor vehicles through power transmitter devices is known. For example, Patent Literature 1 discloses technology for performing wireless communication related to wireless power transfer, such as the wireless power transfer charging status, in order to transmit and receive information needed for charging, such as the current state of the in-vehicle battery and electric power being transmitted between the power transmitter device and a power receiver device mounted on the motor vehicle. In the system in Patent Literature 1, when the power transmitter device detects radar waves that interfere with the wireless communication while the power transmitter device is transmitting electric power to the power receiver device, the wireless communication is terminated. In the system in Patent Literature 1, power transmission from the power transmitter device to the power receiver device is interrupted before the end of wireless communication in order to prevent problems in protecting parts such as overcharging. In the system in Patent Literature 1, after the end of power transmission and wireless communication, another channel on which wireless communication can be performed without interference with the detected radar waves is searched for, and wireless communication is restarted on that channel.

CITATION LIST

Patent Literature

Patent Literature 1: Japanese Unexamined Patent Publication No. 2017-28960

SUMMARY OF INVENTION

Technical Problem

If power transmission is interrupted due to a communication blackout, the charging time taken with wireless power transfer is extended. If the charging time is extended, full charge cannot always be reached by the scheduled time of the departure of the motor vehicle.

The present disclosure will therefore describe a communication control device in which power transmission interruption due to a communication blackout can be reduced.

Solution to Problem

A communication control device according to one aspect of the present disclosure comprises: an antenna; and a control unit that controls wireless communication related to wireless power transfer to a power receiver device through a power transmitter device, wherein the control unit acquires via the antenna a radio wave status of each of a plurality of channels related to the wireless communication, acquires a power transmission status of the wireless power transfer, sets, based on the acquired power transmission status, switching conditions for switching the channel according to the radio wave status, causes the channel to be switched based on the radio wave status and the switching conditions, and causes the wireless communication to continue on the switched channel.

Advantageous Effects of Invention

In the communication control device of the present disclosure, power transmission interruption due to a communication blackout can be reduced.

BRIEF DESCRIPTION OF DRAWINGS

FIG. 3 is a table showing examples of switching conditions for each chronological stages of wireless power transfer and power transmission status.

FIG. 5 is a block diagram showing a wireless power transfer system provided with a communication control device according to a second embodiment.

DESCRIPTION OF EMBODIMENTS

Figure 1:
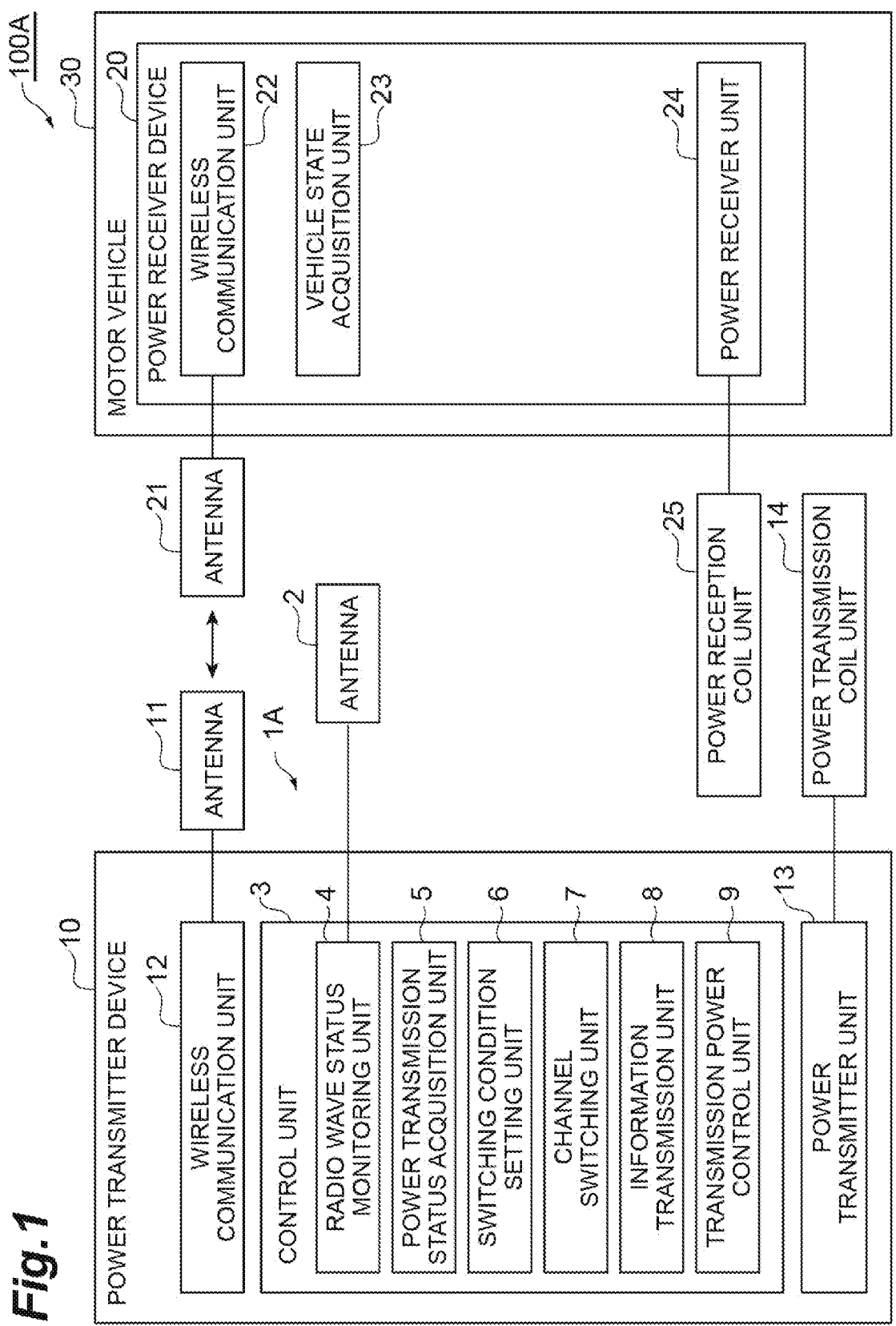
FIG. 1 is a block diagram showing a wireless power transfer system provided with a communication control device according to a first embodiment.

A communication control device according to one aspect of the present disclosure comprises: an antenna; and a control unit that controls wireless communication related to wireless power transfer to a power receiver device through a power transmitter device, wherein the control unit acquires via the antenna a radio wave status of each of a plurality of channels related to the wireless communication, acquires a power transmission status of the wireless power transfer, sets, based on the acquired power transmission status, switching conditions for switching the channel according to the radio wave status, causes the channel to be switched based on the radio wave status and the switching conditions, and causes the wireless communication to continue on the switched channel.

With this communication control device, provided is a communication control device including an antenna, and a control unit that controls wireless communication related to wireless power transfer to a power receiver device through a power transmitter device. The control unit acquires via the antenna the radio wave status of each of a plurality of channels related to wireless communication. The control unit acquires the power transmission status of the wireless power transfer. The control unit sets, based on the acquired power transmission status, the switching conditions for switching the channel according to the radio wave status. The control unit forces the channel to be switched based on the radio wave status and switching conditions, and wireless communication to be continued on the switched channel. Therefore, the possibility that wireless communication can be continued on the channel that was switched according to the power transmission status is increased, and power transmission interruption due to a communication blackout can be reduced.

In some aspects, when the power transmission status is an execution status of the wireless power transfer, the control unit may set switching conditions that allow an easier switch of the channels under the same radio wave status than in the case where the power transmission status is a halt status of the wireless power transfer.

In this configuration, when the power transmission status is the execution status of the wireless power transfer, the control unit sets the switching conditions that allow the easier switch of the channels under the same radio wave status than in the case where the power transmission status is the halt status of wireless power transfer. Therefore, in the halt status of wireless power transfer, channel switching is made difficult, which can reduce the risk of frequent channel switching. In contrast, in the execution status of wireless power transfer, channel switching is made easy, which can reduce power transmission interruption due to a communication blackout.

In some aspects, the power receiver device is mounted on a vehicle, and when the power transmission status is a halt status of the wireless power transfer and when the power transmission status is an execution status of positional adjustment by the vehicle with respect to the power transmitter device, the control unit may set switching conditions that allow an easier switch of the channels under the same radio wave status than in the case where the power transmission status is a halt status of the positional adjustment.

In this configuration, the power receiver device is mounted on a vehicle, and when the power transmission status is the halt status of wireless power transfer and the power transmission status is the execution status of positional adjustment by the vehicle with respect to the power transmitter device, the control unit sets the switching conditions that allow the easier switch of the channels under the same radio wave status than in the case where the power transmission status is the halt status of the positional adjustment. Therefore, in the execution status of positional adjustment, channel switching is made easy, which can reduce interruption of positional adjustment due to a communication blackout.

In the mode in which the power receiver device is mounted on a vehicle, and when the power transmission status is a halt status of the wireless power transfer and when the power transmission status is an execution status of positional adjustment by the vehicle with respect to the power transmitter device, the control unit sets the switching conditions that allow an easier switch of the channels under the same radio wave status than in the case where the power transmission status is a halt status of the positional adjustment, when the power transmission status is an execution status of the positional adjustment, the control unit may set switching conditions that allow an easier switch of the channels under the same radio wave status as the speed of the vehicle increases.

In this configuration, when the power transmission status is the execution status of positional adjustment, the control unit sets the switching conditions that allow the easier switch of the channels under the same radio wave status as the speed of the vehicle increases. For this reason, to avoid the situation where, in the execution status of positional adjustment, the vehicle moves at high speed, and the vehicle moving at high speed passes the power transmitter device, in the status where interruption of positional adjustment due to a communication blackout is not preferred, channel switching is made easy so that interruption of positional adjustment due to a communication blackout can be reduced.

In some aspects, the control unit may reduce transmission power of the wireless power transfer when the radio wave statuses of all the channels satisfy the switching conditions.

In this configuration, the control unit can reduce the transmission power of wireless power transfer when the radio wave statuses of all channels satisfy the switching conditions. Therefore, when there is a risk of a communication blackout, the risk of a problem in protecting parts such as overcharging can be reduced.

In some aspects, the control unit may transmit information on any one of the radio wave status, the power transmission status, the channel on which the wireless communication is being continued, the channel to be switched, and a status of charging by the wireless power transfer.

Further, in this configuration, the control unit transmits information on any one of the radio wave status, the power transmission status, the channel on which wireless communication is being continued, the channel to be switched, and the status of charging by wireless power transfer, so that the information can be recognized by an external information terminal or the like.

Embodiments of the present disclosure will now be described with reference to the accompanying drawings. As shown in FIG. 1, a wireless power transfer system 100A of the first embodiment of the present disclosure includes a power transmitter device 10 and a power receiver device 20 mounted on a motor vehicle 30. In the wireless power transfer system 100A, power is supplied from the power transmitter device 10 to the power receiver device 20. The power transmitter device 10 is installed in, for example, a parking lot. The motor vehicle 30 is, for example, an electric motor vehicle. The wireless power transfer system 100A is configured to supply power to the power receiver device 20 mounted on the motor vehicle 30 such as an electric motor vehicle arriving at such as a parking lot by using magnetic coupling between coils using such as a magnetic resonance system and an electromagnetic induction system. Note that the power receiver device 20 may be mounted on various vehicles, such as plug-in hybrid motor vehicles, drones, and underwater vehicles, instead of electric motor vehicles.

The power transmitter device 10 is a device that supplies power to the power receiver device 20 by wireless power transfer. The power transmitter device 10 comprises an antenna 11, a wireless communication unit 12, a power transmitter unit 13, a power transmission coil unit 14, and a communication control device 1A. The wireless communication unit 12 performs wireless communication related to wireless power transfer to the power receiver device 20 through the power transmitter device 10 via the antenna 11. Wireless communication related to wireless power transfer refers to wireless communication for transmitting and receiving information needed for charging, for example, the state of the in-vehicle battery of the motor vehicle 30, the power being transmitted, the speed of the motor vehicle 30 and the accelerator opening of the motor vehicle 30, and the position of the motor vehicle 30 with respect to the power transmitter device 10.

In this embodiment, wireless communication related to wireless power transfer is performed, for example, in the 5 GHz band according to the IEEE 802.11 standard of a wireless LAN. In the 5 GHz band of the IEEE 802.11 standard of a wireless LAN, the channels included in W52, W53 and W56 are used. W52 is a channel group in the 5.15 to 5.25 GHz band consisting of a total of four channels: the channels 36, 40, 44, and 48. W53 is a channel group in the 5.25 to 5.35 GHz band consisting of a total of four channels: the channels 52, 56, 60, and 64. W56 is a channel group in the 5.47 to 5.725 GHz band consisting of a total of 11 channels: 100, 104, 108, 112, 116, 120, 124, 128, 132, 136, and 140. Accordingly, in this embodiment, a total of 19 channels are used. The frequency bands of each of the 19 channels are completely independent so that the channels do not interfere with each other.

The power transmitter unit 13 generates high-frequency AC power suitable for wireless power transfer from the power supplied from such as a power source not shown in the drawing. The power transmission coil unit 14 generates a magnetic field from the AC power supplied from the power transmitter unit 13. This magnetic field is an alternating magnetic field that changes in a sinusoidal manner over time.

The communication control device 1A is installed inside an existing power transmitter device 10 comprising, for example, an antenna 11, a wireless communication unit 12, a power transmitter unit 13, and a power transmission coil unit 14, and controls the operation of the power transmitter device 10. The communication control device 1A comprises an antenna 2 and a control unit 3. The antenna 2 is used for the control unit 3 to acquire the radio wave status of each of the channels related to wireless communication related to wireless power transfer via the antenna 2. Note that the antenna 2 may also serve as the antenna 11 of the wireless communication unit 12.

The control unit 3 controls wireless communication related to wireless power transfer to the power receiver device 20 through the power transmitter device 10. The control unit 3 has a radio wave status monitoring unit 4, a power transmission status acquisition unit 5, a switching condition setting unit 6, a channel switching unit 7, an information transmission unit 8, and a transmission power control unit 9. The radio wave status monitoring unit 4 acquires the radio wave status of each of the channels related to wireless communication related to wireless power transfer via the antenna 2. As will be described later, the radio wave status of each of the channels includes, for example, the time occupied by others to each channel, the communication method for communication by others to each channel, and the radio field intensity of communication by others to each channel.

The power transmission status acquisition unit 5 acquires the power transmission status of wireless power transfer. As will be described later, the power transmission status refers to, for example, the status in each chronological stage of wireless power transfer. The power transmission status includes the execution status of wireless power transfer and the halt status of wireless power transfer. The execution status of wireless power transfer refers to a situation in which power transmission is performed by wireless power transfer. The halt status of wireless power transfer refers to a situation in which power transmission by wireless power transfer is not performed, for example, before the start of power transmission by wireless power transfer and after the end of the power transmission. The power transmission status also includes the execution status of positional adjustment by such as the motor vehicle 30 and other vehicles with respect to the power transmitter device 10 and the halt status of positional adjustment by such as the motor vehicle 30 or other vehicles with respect to the power transmitter device 10. The execution status of positional adjustment by such as the motor vehicle 30 and other vehicles with respect to the power transmitter device 10 refers to a status where positional adjustment with respect to the power transmitter device 10 is performed by such as the motor vehicle 30 and other vehicles. The halt status of positional adjustment by such as the motor vehicle 30 and other vehicles with respect to the power transmitter device 10 refers to a status where positional adjustment with respect to the power transmitter device 10 is not performed by such as the motor vehicle 30 and other vehicles before the start of positional adjustment and after the end of positional adjustment, for example.

To be specific, the power transmission status includes, for example, a status where, in the chronologically first stage of wireless power transfer, wireless communication related to wireless power transfer between the power transmitter device 10 and the power receiver device 20 has not been started before the start of power transmission related to wireless power transfer. The power transmission status also includes, for example, a status where, in the chronologically second stage of wireless power transfer, wireless communication related to wireless power transfer between the power transmitter device 10 and the power receiver device 20 is being performed, while positional adjustment by the motor vehicle 30 mounted with the power receiver device 20 with respect to the power transmitter device 10 has not been started before the start of power transmission related to wireless power transfer.

The power transmission status also includes, for example, a status where, in the chronologically third stage of wireless power transfer, wireless communication related to wireless power transfer between the power transmitter device 10 and the power receiver device 20 is being performed, and positional adjustment by the motor vehicle 30 mounted with the power receiver device 20 with respect to the power transmitter device 10 is being performed before the start of power transmission related to wireless power transfer. The power transmission status also includes, for example, a status where, in the chronologically fourth stage of wireless power transfer, wireless communication related to wireless power transfer between the power transmitter device 10 and the power receiver device 20 is being performed during power transmission related to wireless power transfer. The power transmission status also includes, a status where, in the chronologically fifth stage of wireless power transfer, wireless communication related to wireless power transfer between the power transmitter device 10 and the power receiver device 20 has ended after the end of power transmission related to wireless power transfer.

The switching condition setting unit 6 sets, based on the acquired power transmission status, the switching conditions for switching the channel according to the radio wave status. As will be described later, the ease of switching the channel of switching conditions under the same radio wave status increases, for example, in power transmission statuses in the chronologically first, second, third, and fourth stages of the wireless power transfer in ascending order. In the chronologically fifth stage of wireless power transfer, the switching conditions are the hardest conditions of switching as in the first stage. Note that the switching conditions refer to, for example, the time occupied by others to each channel in a radio wave status and the threshold of the radio field intensity of communication by others to each channel in a radio wave status.

The channel switching unit 7 causes the wireless communication unit 12 to switch the channel according to the radio wave status and the switching conditions. The channel switching unit 7 causes the wireless communication unit 12 to continue wireless communication on the switched channel. The information transmission unit 8 transmits information on any one of a radio wave status, a power transmission status, a channel on which the wireless communication unit 12 is forced to continue wireless communication related to wireless power transfer, the channel to be switched by the wireless communication unit 12, and a wireless power transfer charging status. The charging status includes, for example, the state of the in-vehicle battery of the motor vehicle 30 and the predicted time until the end of charging.

When the radio wave statuses of all channels satisfy the switching conditions, the transmission power control unit 9 transmits a command signal to the power transmitter unit 13, reduces the power transmitted through wireless power transfer by the power transmitter unit 13, and then terminates the power transmission. In order to adjust the position by the motor vehicle 30 with respect to the power transmitter device 10, the power transmitter device 10 comprises a sensor (not shown in the drawing) for detecting the position of the motor vehicle 30 with respect to the power transmitter device 10.

Meanwhile, the power receiver device 20 mounted on the motor vehicle 30 comprises an antenna 21, a wireless communication unit 22, a vehicle state acquisition unit 23, a power receiver unit 24, and a power reception coil unit 25. The antenna 21 and the wireless communication unit 22 have a structure corresponding to the antenna 11 and the wireless communication unit 22 of the power transmitter device 10. The vehicle state acquisition unit 23 acquires information on the speed of the motor vehicle 30 through such as a sensor (not shown in the drawing) mounted on the motor vehicle 30 and transmits it to the wireless communication unit 22. Note that the information on the speed of the motor vehicle 30 may be acquired based on the accelerator opening, the inclination of the speed lever, and the selected speed button, besides direct measurement of the speed of the motor vehicle 30. The wireless communication unit 22 transmits the information transmitted from the vehicle state acquisition unit 23 to the wireless communication unit 12 of the power transmitter device 10 via the antenna 21. The wireless communication unit 22 performs wireless communication related to wireless power transfer, with the wireless communication unit 12 of the power transmitter device 10.

The power receiver unit 24 is a device that receives power from the power transmitter unit 13 of the power transmitter device 10 and supplies power to a load such as an in-vehicle battery of the motor vehicle 30. The power receiver unit 24 comprises, for example, a power reception coil unit 25 attached to the bottom surface of the vehicle body of the motor vehicle 30. The magnetic flux generated in the power transmission coil unit 14 interlinks with the power reception coil unit 25, so that the power reception coil unit 25 generates induced current. Thus, the power reception coil unit 25 wirelessly receives the power from the power transmission coil unit 14. The power received by the power reception coil unit 25 is supplied to a load such as an in-vehicle battery of the motor vehicle 30.

Figure 2:
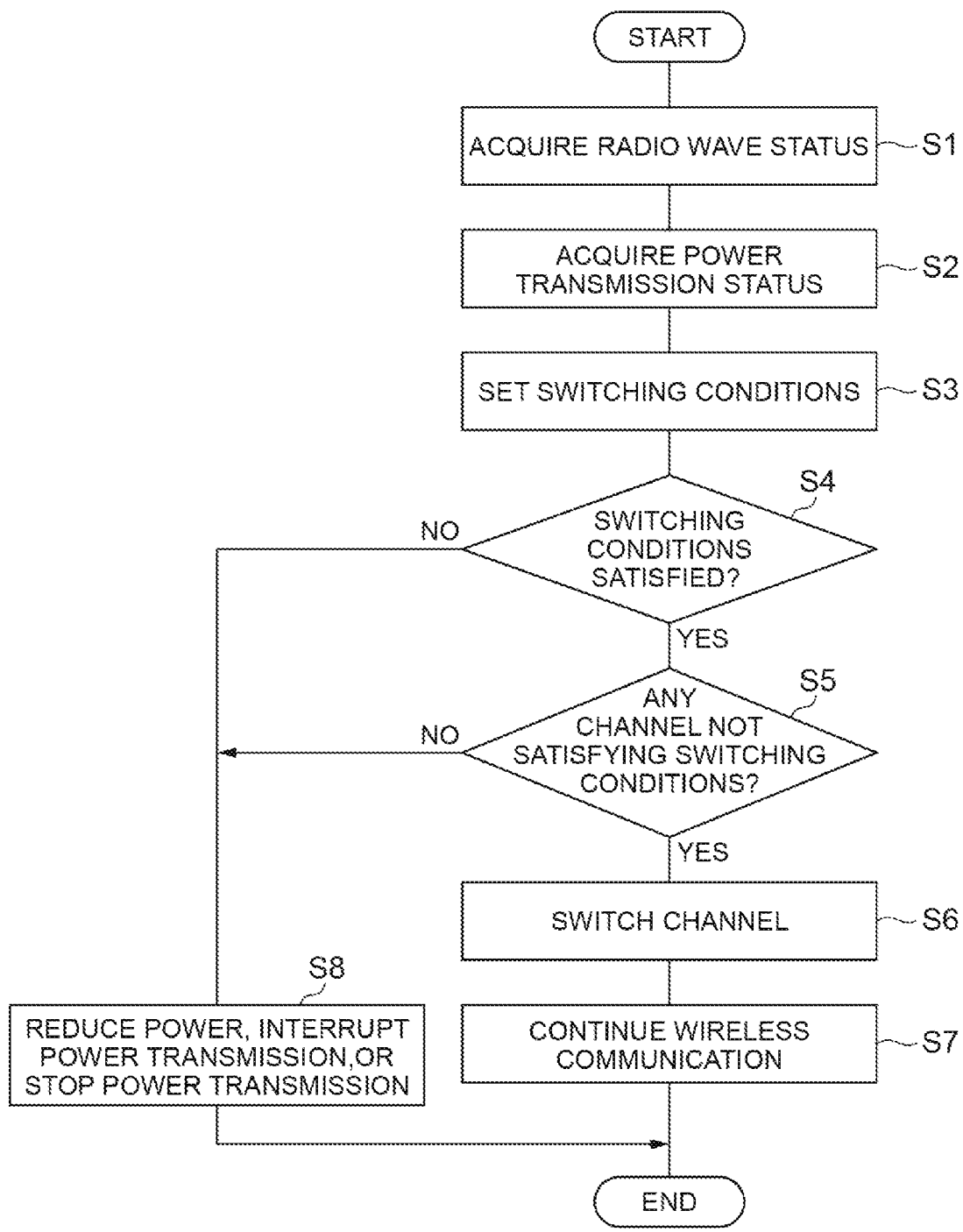
FIG. 2 is a flowchart showing the operation of the communication control device according to the first embodiment.

The operations of the wireless power transfer system 100A and the communication control device 1A of the present embodiment will now be described. As shown in FIG. 2, the radio wave status monitoring unit 4 of the control unit 3 of the communication control device 1A acquires via the antenna 11 the radio wave status of each channel related to wireless communication (S1). The radio wave status of each of channels includes, for example, the time occupied by the communication by others to each of the channels, the communication method for communication by others to each of the channels, and the radio field intensity of communication by others to each of the channels.

The time occupied by others to each channel may be acquired by measuring the time occupied by the communication by others, or may be acquired from information on the occupancy time included in the header of communication by others. The communication method for communication by others refers to, for example, whether or not the communication method for communication by others is the same as the communication method in the 5 GHz band according to the IEEE 802.11 standard of the wireless LAN that is the communication method for the wireless communication unit 12. Examples of the communication method for communication by others include a communication method in the 2.4 GHz band according to the IEEE 802.15.1 standard, which is not the communication method according to the IEEE 802.11 standard.

Note that, for example, the cycle in which the radio wave status monitoring unit 4 acquires the radio wave status of the channel on which the wireless communication unit 12 is performing wireless communication related to wireless power transfer may be made longer than the cycle in which the radio wave status monitoring unit 4 acquires the radio wave status of the channel on which the wireless communication unit 12 is not performing wireless communication related to wireless power transfer.

The power transmission status acquisition unit 5 of the control unit 3 of the communication control device 1A acquires the power transmission status of the wireless power transfer (S2). Examples of power transmission status include the statuses shown in FIG. 3. As shown in FIG. 3, statuses for the respective chronological stages of wireless power transfer are set as power transmission statuses. In the power transmission status in the chronologically first stage of wireless power transfer, wireless communication related to wireless power transfer between the power transmitter device 10 and the power receiver device 20 has not been started before the start of power transmission related to wireless power transfer.

In the power transmission status in the chronologically second stage of wireless power transfer, wireless communication related to wireless power transfer between the power transmitter device 10 and the power receiver device 20 is being performed, while positional adjustment by the motor vehicle 30 mounted with the power receiver device 20 with respect to the power transmitter device 10 has not been started before the start of power transmission. The power transmission status in the second stage is a status in which the wireless communication unit 22 of the power receiver device 20 searches for an arbitrary access point, and the wireless communication unit 22 of the power receiver device 20 has started wireless communication with the wireless communication unit 12 of the power transmitter device 10.

In the power transmission status in the chronologically third stage of wireless power transfer, wireless communication related to wireless power transfer between the power transmitter device 10 and the power receiver device 20 is being performed, and positional adjustment by the motor vehicle 30 mounted with the power receiver device 20 with respect to the power transmitter device 10 is being performed before the start of power transmission related to wireless power transfer. In the power transmission status in the third stage, by wireless communication, the wireless communication unit 12 of the power transmitter device 10 and the wireless communication unit 22 of the power receiver device 20 transmit and receive information on the position of the motor vehicle 30 with respect to the power transmitter device 10 that was detected by the sensor in the power transmitter device 10 (not shown in the drawing), and the speed of the motor vehicle 30, to and from each other.

In the power transmission status in the chronologically fourth stage of wireless power transfer, power transmission related to wireless power transfer is being performed, and wireless communication related to wireless power transfer between the power transmitter device 10 and the power receiver device 20 is being performed. In the power transmission status in the fourth stage, by wireless communication, the wireless communication unit 12 of the power transmitter device 10 and the wireless communication unit 22 of the power receiver device 20 transmit and receive information needed for charging, such as the state of the in-vehicle battery of the motor vehicle 30 and the power being transmitted, to and from each other. In the chronologically fifth stage of wireless power transfer, wireless communication related to wireless power transfer between the wireless communication unit 12 of the power transmitter device 10 and the wireless communication unit 22 of the power receiver device 20 has ended after the end of power transmission related to wireless power transfer.

The switching conditions for switching the channel according to the radio wave status are set by the switching condition setting unit 6 of the control unit 3 of the communication control device 1A, based on the acquired power transmission status (S3). For instance, as shown in FIG. 3, a table showing ease of channel switching of switching conditions for the power transmission status is preset. The switching condition setting unit 6 sets the switching conditions for switching the channel according to the radio wave status, referring to the table as shown in FIG. 3. The ease of switching of the switching conditions is shown as a threshold of an occupancy time condition related to communication by others to each channel and a threshold of radio field intensity related to communication by others to each channel, for example.

As shown in FIG. 3, in the chronologically first and fifth stages of wireless power transfer, wireless communication related to wireless power transfer between the wireless communication unit 12 of the power transmitter device 10 and the wireless communication unit 22 of the power receiver device 20 is not performed, so that switching conditions that allow the switch of the channel to be most difficult are set under the same radio wave status. In the chronologically second stage of the wireless power transfer, wireless communication related to wireless power transfer between the wireless communication unit 12 of the power transmitter device 10 and the wireless communication unit 22 of the power receiver device 20 is performed, while positional adjustment by the motor vehicle 30 mounted with the power receiver device 20 with respect to the power transmitter device 10 has not been started, so that switching conditions that allow an easier switch of the channels under the same radio wave status than in the first and fifth stages and a more difficult switch of the channels under the same radio wave status than in the third stage are set.

In the chronologically third stage of wireless power transfer, wireless communication related to wireless power transfer between the wireless communication unit 12 of the power transmitter device 10 and the wireless communication unit 22 of the power receiver device 20 has been started, and positional adjustment by the motor vehicle 30 mounted with the power receiver device 20 with respect to the power transmitter device 10 has been started, while power transmission related to wireless power transfer has not been started. For this reason, it is highly necessary to continue wireless communication, so that switching conditions that allow an easier switch of the channels under the same radio wave status than in the second stage and make it more difficult to switch the channel under the same radio wave status than in the fourth stage are set.

In the chronologically fourth stage of wireless power transfer, wireless communication related to wireless power transfer between the wireless communication unit 12 of the power transmitter device 10 and the wireless communication unit 22 of the power receiver device 20 is being performed, and power transmission related to wireless power transfer has been started. For this reason, it is most highly necessary to continue wireless communication, so that switching conditions that allow an easier switch of the channels under the same radio wave status than in the first to third stages and the fifth stage are set.

As described above, when the power transmission status is the execution status of wireless power transfer, the switching condition setting unit 6 of the control unit 3 sets switching conditions that allow an easier switch of the channels under the same radio wave status than in the case where the power transmission status is the halt status of wireless power transfer. Moreover, when the acquired power transmission status is the halt status of wireless power transfer and the power transmission status is the execution status of positional adjustment by the motor vehicle 30 with respect to the power transmitter device 10, the switching condition setting unit 6 of the control unit 3 sets switching conditions that allow an easier switch of the channels under the same radio wave status than in the case where the power transmission status is halt status of the positional adjustment.

In addition, in the switching condition setting unit 6 of the control unit 3, when the power transmission status is the execution status of positional adjustment by the motor vehicle 30 with respect to the power transmitter device 10, in order to reduce the risk that the motor vehicle 30 moving at high speed passes the power transmitter device 10, the control unit sets the switching conditions that allow an easier switch of the channels under the same radio wave status as the speed of the motor vehicle 30 increases.

Figure 4:
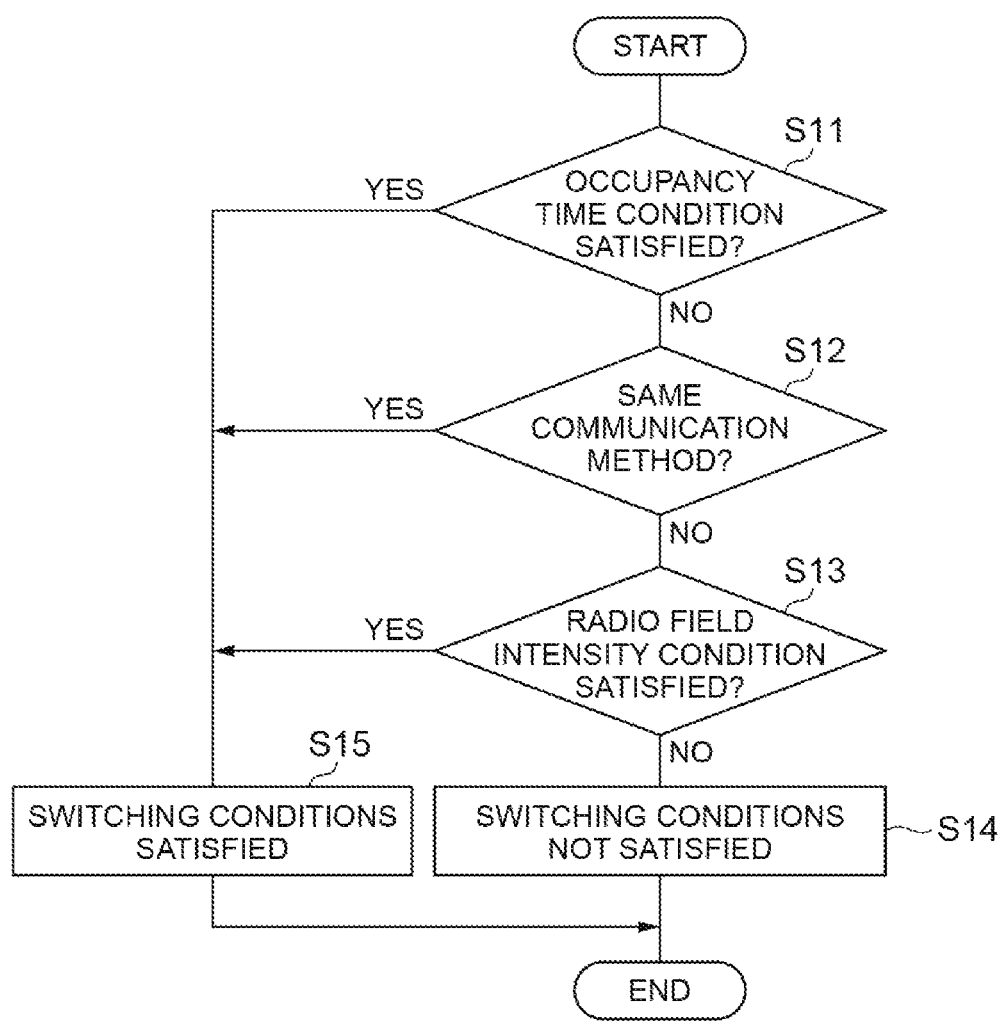
FIG. 4 is a flowchart showing the operation of determining whether or not the switching conditions are satisfied.

The channel switching unit 7 of the control unit 3 of the communication control device 1A determines whether or not the radio wave status of each channel satisfies the set switching conditions (S4). Determination of whether or not the radio wave status of each channel satisfies the set switching conditions is performed as shown in FIG. 4, for example. First, the channel switching unit 7 of the control unit 3 determines whether or not the condition of the time occupied by communication by others set for each power transmission status by the switching condition setting unit 6 of the control unit 3 is satisfied (S11). This is because the time occupied by the communication by others has the greatest effect on wireless communication. If the condition of the time occupied by the communication by others is satisfied, it is determined that the switching conditions are satisfied (S15).

If the condition of the time occupied by the communication by others is not satisfied, the channel switching unit 7 of the control unit 3 determines whether or not the communication method for communication by others is the same as the communication method in the 5 GHz band according to the IEEE 802.11 standard of the wireless LAN that is the communication method for the wireless communication unit 12 (S12). If the communication method for communication by others is the same as the communication method in the 5 GHz band according to the IEEE 802.11 standard of the wireless LAN that is the communication method for the wireless communication unit 12, it is determined that the switching conditions are satisfied (S15).

If the communication method for communication by others is not the same as the communication method in the 5 GHz band according to the IEEE 802.11 standard of the wireless LAN that is the communication method for the wireless communication unit 12, and is, for example, not a communication method according to the IEEE 802.11 standard but the communication method in the 2.4 GHz band according to the IEEE 802.15.1 standard, the channel switching unit 7 of the control unit 3 determines whether or not the condition of the radio field intensity of communication by others set for each power transmission status by the switching condition setting unit 6 of the control unit 3 (S13). When the condition of the radio field intensity of communication by others is satisfied, it is determined that the switching conditions are satisfied (S15). When none of the occupancy time condition, the communication method condition, and the radio field intensity condition are satisfied, it is determined that the switching conditions are not satisfied (S14).

Returning to FIG. 2, when the channel switching unit 7 of the control unit 3 determines whether or not the radio wave status of each channel satisfies the set switching conditions as described above, if there is a channel that does not satisfy the switching conditions (S5), the channel switching unit 7 of the control unit 3 switches to the channel that does not satisfy the switching conditions (S6). The control unit 3 causes the wireless communication on the channel that was switched by the wireless communication unit 12 to continue (S7). In contrast, when there is no channel that does not satisfy the switching conditions (S5), the transmission power control unit 9 of the control unit 3 reduces the transmission power of the wireless power transfer (S8). The transmission power control unit 9 of the control unit 3 interrupts the power transmission after causing the power transmitter unit 13 to continue the power transmission by the power reduced for 2 seconds, for example. When the power transmission by the power transmitter unit 13 has not been started, the transmission power control unit 9 of the control unit 3 causes the power transmitter unit 13 to stop the power transmission.

In the operations in S1 to S8, the information transmission unit 8 of the control unit 3 transmits information on any one of a radio wave status, a power transmission status, a channel on which the wireless communication unit 12 is forced to continue wireless communication related to wireless power transfer, the channel to which the wireless communication unit 12 is forced to switch, and a status of charging by the wireless power transfer.

According to this embodiment, provided is a communication control device 1A including an antenna 2, and a control unit 3 for controlling wireless communication related to wireless power transfer to a power receiver device 20 through a power transmitter device 10. The control unit 3 acquires via the antenna 2 the radio wave status of each of the channels related to wireless communication. The control unit 3 acquires the power transmission status of the wireless power transfer. The control unit 3 sets, based on the acquired power transmission status, the switching conditions for switching the channel according to the radio wave status. The control unit 3 forces channels to be switched based on the radio wave status and switching conditions, and wireless communication to be continued on the switched channels. Therefore, the possibility that wireless communication can be continued on the channel that was switched according to the power transmission status is increased, and power transmission interruption due to a communication blackout can be reduced.

Further, according to this embodiment, when the power transmission status is the execution status of wireless power transfer, the control unit 3 sets switching conditions that allow an easier switch of the channels under the same radio wave status than in the case where the power transmission status is the halt status of wireless power transfer. Therefore, in the halt status of wireless power transfer, channel switching is made difficult, which can reduce the risk of frequent channel switching. In contrast, in the execution status of wireless power transfer, channel switching is made easy, which can reduce power transmission interruption due to a communication blackout.

Moreover, according to this embodiment, the power receiver device 20 is mounted on the motor vehicle 30, and when the power transmission status is the halt status of wireless power transfer and the power transmission status is the execution status of positional adjustment by the motor vehicle 30 with respect to the power transmitter device 10, the control unit 3 sets switching conditions that allow an easier switch of the channels under the same radio wave status than in the case where the power transmission status is the halt status of the positional adjustment. Therefore, in the execution status of the positional adjustment, channel switching is made easy, which can reduce interruption of positional adjustment due to a communication blackout.

Further, according to this embodiment, when the power transmission status is an execution status of the positional adjustment, the control unit 3 sets switching conditions that allow an easier switch of the channels under the same radio wave status as the speed of the motor vehicle 30 increases. For this reason, to avoid the situation where, in the execution status of positional adjustment, the motor vehicle 30 moves at high speed, and the motor vehicle 30 moving at high speed passes the power transmitter device 10, in the status where interruption of positional adjustment due to a communication blackout is not preferred, channel switching is made easy so that interruption of positional adjustment due to a communication blackout can be reduced.

Further, according to this embodiment, the control unit 3 can reduce the transmission power of wireless power transfer when the radio wave statuses of all channels satisfy the switching conditions. Therefore, when there is a risk of a communication blackout, the risk of a problem in protecting parts such as overcharging can be reduced.

Further, according to this embodiment, the control unit 3 transmits information on any one of a radio wave status, a power transmission status, a channel on which wireless communication is being continued, a channel to be switched, and a status of charging by wireless power transfer, so that the information can be recognized by such as an external information terminal.

Further, in this embodiment, the antenna 11 for the wireless communication unit 12 to perform wireless communication related to wireless power transfer and the antenna 2 for the radio wave status monitoring unit 4 to acquire the radio wave status of each of the channels related to wireless communication related to wireless power transfer are separated, which can reduce the load on the antenna 11.

The second embodiment of the present disclosure will now be described. As shown in FIG. 5, a wireless power transfer system 100B of this embodiment comprises a communication control device 1B outside the power transmitter device 10. Thus, the communication control device 1B can be easily applied to the existing power transmitter device 10, and power transmission interruption due to a communication blackout in wireless power transfer can be reduced.

Although the embodiments and modifications of the present disclosure have been described so far, the present disclosure is not limited to the above-described embodiments. For instance, although the mode in which wireless communication related to wireless power transfer is performed in the 5 GHz band according to the IEEE 802.11 standard of a wireless LAN has been mainly described in the aforementioned embodiments, wireless communication related to wireless power transfer may be performed by another communication method. For instance, wireless communication related to wireless power transfer may be performed in the 2.4 GHz band according to the IEEE 802.11 standard of a wireless LAN. In this case, when channel switching is made, the switched channel may be a channel with the least possibility of interference with other's wireless communication.

INDUSTRIAL APPLICABILITY

In the communication control device of the present disclosure, power transmission interruption due to a communication blackout can be reduced.

REFERENCE SIGNS LIST 1A, 1B Communication control device
2 Antenna
3 Control unit
4 Radio wave status monitoring unit
5 Power transmission status acquisition unit
6 Switching condition setting unit
7 Channel switching unit
8 Information transmission unit
9 Transmission power control unit
10 Power transmitter device
11 Antenna
12 Wireless communication unit
13 Power transmitter unit
14 Power transmission coil unit
20 Power receiver device
21 Antenna
22 Wireless communication unit
23 Vehicle state acquisition unit
24 Power receiver unit
25 Power reception coil unit
30 Motor vehicle
100A, 100 Wireless power transfer system

The invention claimed is:

1. A communication control device comprising:
an antenna; and
a control unit controlling wireless communication related to wireless power transfer to a power receiver device through a power transmitter device;
the control unit configured to:
  acquire via the antenna a radio wave status of each of a plurality of channels related to the wireless communication,
  acquire a power transmission status of the wireless power transfer,
  set, based on the acquired power transmission status of the wireless power transfer, switching conditions for channel switching according to the radio wave status of each of the plurality of channels related to the wireless communication,
  cause channel switching based on the radio wave status of each of the plurality of channels related to the wireless communication and the switching conditions for channel switching, and
  cause the wireless communication to continue on a selected channel;
wherein:
the power receiver device is mounted on a vehicle, and
when the acquired power transmission status of the wireless power transfer is a halt status of the wireless power transfer and an execution status of a positional adjustment by the vehicle with respect to the power transmitter device, the control unit sets the switching conditions for channel switching allowing an easier switch of each of the plurality of channels under a same radio wave status than in a case where the acquired power transmission status of the wireless power transfer is a halt status of both the wireless power transfer and the positional adjustment.

2. The communication control device according to claim 1, wherein when the power transmission status is an execution status of the positional adjustment, the control unit sets the switching conditions for channel switching allowing the-easier switch of channels under the same radio wave status as a speed of the vehicle increases.

3. The communication control device according to claim 1, wherein the control unit transmits information with respect to the acquired power transmission status of the wireless power transfer, and a status of charging by the wireless power transfer.

4. The communication control device according to claim 1, wherein when the acquired power transmission status of the wireless power transfer is an execution status of the wireless power transfer, the control unit sets the switching conditions for channel switching allowing an easier switch of each of the plurality of channels under the same radio wave status than in another case where the acquired power transmission status of the wireless power transfer is the halt status of the wireless power transfer.

5. The communication control device according to claim 1, wherein the selected channel is a channel which does not satisfy the switching conditions.

6. A communication control device comprising:
an antenna; and
a control unit controlling wireless communication related to wireless power transfer to a power receiver device through a power transmitter device;
the control unit configured to:
  acquire via the antenna a radio wave status of each of a plurality of channels related to the wireless communication,
  acquire a power transmission status of the wireless power transfer,
  set, based on the acquired power transmission status of the wireless power transfer, switching conditions for channel switching according to the radio wave status of each of the plurality of channels related to the wireless communication,
  cause channel switching based on the radio wave status of each of the plurality of channels related to the wireless communication and the switching conditions for channel switching, and
  cause the wireless communication to continue on a selected channel;
wherein the control unit reduces transmission power of the wireless power transfer when the radio wave status of each of the plurality of channels related to the wireless communication satisfies the switching conditions.

7. The communication control device according to claim 6, wherein when the power transmission status is an execution status of the wireless power transfer, the control unit sets the switching conditions allowing an easier switch of each of the plurality of channels under the same radio wave status than in a case where the power transmission status is a halt status of the wireless power transfer.

8. The communication control device according to claim 6, wherein the selected channel is a channel which does not satisfy the switching conditions for channel switching.

* * * * *